Oct. 31, 1967  G. E. CHRISTIANSEN ET AL  3,349,802
CAM CONTROLLED ANTI-SIPHON MIXING VALVE
Filed April 5, 1965
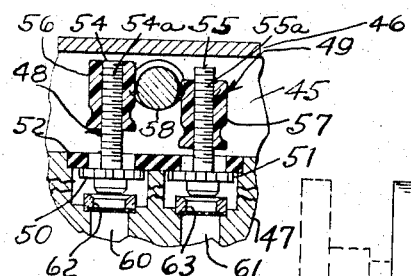
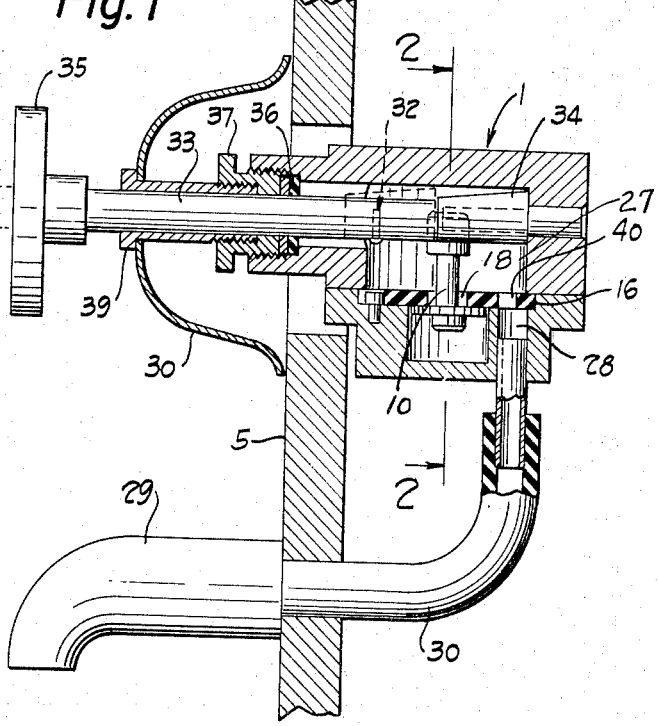
INVENTORS
G.E. CHRISTIANSEN
& W. E. POLITZ
BY Robb & Robb
attorneys United States Patent Office 3,349,802
Patented Oct. 31, 1967

3,349,802
CAM CONTROLLED ANTI-SIPHON MIXING VALVE
Gerald E. Christiansen, Flora, and William E. Politz, Delphi, Ind., assignors to Stephen A. Young, Monticello, Ind.
Filed Apr. 5, 1965, Ser. No. 445,456
3 Claims. (Cl. 137—636.1)

ABSTRACT OF THE DISCLOSURE

This invention relates to a mixing valve for mixing hot and cold water in domestic plumbing installations primarily in which tipping valves are provided and arranged to shut-off water with water pressure and of a form to prevent siphoning action if the water supply is interrupted.

This invention relates to plumbing fixtures or fittings and particularly finds application in fittings known as mixing valves whether of the concealed or exposed type.

While the invention is most advantageously availed of in the mixing valves previously referred to, it may also be used for single valves which are of simple construction and provide long life and low maintenance.

More particularly the invention is directed to a type of valve in which a single control member is availed of to regulate hot and cold water or to mix the same and regulate discharge thereof for the purposes primarily in the domestic fitting market.

As suggested, one of the basic advantages of the invention is the simplicity of construction and few parts necessary for constructing a valve of this nature as well as the elimination or omission, more properly, of springs or other similar critical parts which tend to get out of order or to become unduly worn or non-functioning after relatively short periods of time.

An important advance offered by the subject invention in connection with the elimination of springs which might be used, is the reliance upon water pressure to maintain the valve in closed condition, the valve being constructed so as to prevent siphoning action when the water pressure in the supply lines falls below a predetermined maximum and/or the pressure in the outlet on backflow becomes greater than the inlet pressure such that siphoning might take place, the valve hereof obviating any such occurrence.

While the ordinary plumbing valves of the class generally known and heretofore availed of, including stems which required threads for lifting the seat washer off of a seat, and thus may be classified as an unseating operation, the manner of operation of the instant valve is novel in that it unseats a member against water pressure permitting the water pressure to effect seating when the various parts of the valve are adjusted to respond to such condition.

As previously suggested likewise, the simplicity of manufacture, the reduction in critical dimensions and ability to provide parts which are easily replaceable, all serve to indicate at least some of the advantages residing herein, and suggests that the primary object of the invention is to accomplish a mixing valve action with few parts, responsive in infinite temperature ranges and at the same time to regulate flow whether of hot or cold or a mixture thereof, depending upon the position of a shut-off and actuating member which is responsive to the manipulation of an operating device in a reciprocal fashion for flow control and in a rotary fashion for temperature control.

A more sophisticated form of device is contemplated where cost is not as controlling and involves the provision of means to make possible adjustment of various instrumentalities to compensate for low water pressures which may be found in certain areas, the volume of water delivered also being susceptible of regulation.

Further, since water pressure is used for effecting seating to shut off flow, it is desirable that no foreign substance be permitted to affect such action and therefore a strainer may be provided which effectively screens out foreign particles and at the same time reduces the noises often occurring in valves of this general construction.

The foregoing suggests additional valuable objects and improvements provided by this invention including more universal applicability of the valve hereof as well as greater adaptability to conditions encountered in installation and operation.

Other and further objects of the invention will be suggested by the foregoing and disclosed in the specification as well as shown in the drawings wherein:

FIGURE 1 is a sectional view taken in exemplary form of the valve, illustrating its mounting when in a concealed fitting for supply of water to a tub or the like.

FIGURE 2 is an enlarged sectional view taken about on the line 2—2 of FIGURE 1 looking in the direction of the arrows.

FIGURE 3 is a transverse sectional view taken about on the line 3—3 of FIGURE 2 looking in the direction of the arrows.

FIGURE 4 is an enlarged fragmentary view, partly in section, and illustrating in somewhat exaggerated manner the important operating feature of the invention.

FIGURE 5 is a bottom view of a shut-off and actuating member.

FIGURE 6 is a plan view of a member which incorporates the seats therein.

FIGURE 7 is a sectional side view of a modification of the member of FIGURE 6.

FIGURE 8 is a fragmentary sectional view of a modified form of certain of the actuating instrumentalities.

Referring to FIGURE 1, the valve hereof involves a body generally designated 1 which incorporates therein a mixing section 2 at the upper part connected to an inlet section 3, by means of bolts such as 4.

The body 1 as a whole is intended to be mounted about as indicated in FIGURE 1 so as to extend through a wall generally designated 5.

Referring to FIGURE 2 at this point, the inlet section 3 includes a pair of inlet chambers 6 and 7 which are identical, and supplied by supply lines 8 and 9 respectively from any particular source, the line 8 being usually hot water and the line 9 the cold water supply.

The inlet chambers 6 and 7 are cylindrically shaped and adapted to have supported for guidance therein, in each case, a shut-off and actuating member 10 in the chamber 6 and 11 in the chamber 7.

These shut-off and actuating members 10 and 11 are identical and as suggested in the figures, include at the lower ends thereof seat portions 12 and 13 of generally disc-like configuration which are in turn engaged with the rods 14 and 15 which extend upwardly through a disc 16 shown in plan in FIGURE 6, as removed from the body, said disc 16 including a pair of passages 18 and 19 extending upwardly therethrough, the rods 14 and 15 as indicated in the other figures passing through said passageways 18 and 19.

The disc 16 may be either a solid plastic or be provided on its upper and lower surfaces 20 and 21 respectively with a bonded layer of rubber or similar resilient material as in FIGURE 7 where it is denoted 16a which, in conjunction with the seat portions 12 and 13, will effect a sealing of the passageways 18 and 19 when water pressure is introduced into the chambers 6 and 7 to act upon said seat portions. The disc also provides a seal between body sections 2 and 3.

As indicated in FIGURE 5, the seat portions 12 and 13 are provided with a series of radially extending fingers 22.

At the upper ends of the rods 14 and 15 and of generally cylindrical form, are the heads 24 and 25, these heads being provided in each case at the lowermost portion thereof with seat sections 24a and 25a, these seat sections being adapted to coact with what may be termed anti-siphon seats provided by the upper layer of resilient material on the disc 16 at the upper end of the passageways 18 and 19.

The purpose of this seating arrangement is to avail of the seat portions 12 and 13 to shut-off the flow of water through the passageways 18 and 19 when water pressure is available for such purpose from the inlet chambers 6 and 7. On the other hand when there is any drop in the water pressure in such chambers and/or an increase in the back pressure into the chamber above the disc 16, which chamber will be designated 27 and denoted as a mixing chamber, which might permit impure water to flow back through the valve by reason of the fact that the outlet indicated at 28 makes possible such flow from a spout such as 29 connected to the outlet 28 by suitable piping such as 30.

The dotted line positions of the shut-off and actuating members indicate the condition heretofore described as in the so-called anti-siphon position which effectively prevents anti-siphon action, because of the seating of the heads 24 and 25 on the seats at the upper end of the passageways 18 and 19 respectively.

The full lines in FIGURE 2 represent the positions of the shut-off and actuating means where fluid pressure in the chambers 6 and 7 is adequate for operation thereof, and in order to effect the directing of the water from one or both of the chambers, to the outlet 28, an operating device generally designated 32 is availed of, and as seen in FIGURE 1, said device includes a stem 33, at one end of which is located a cam 34 which is of involute form, having suitable cam lobes thereon so that by rotation of the cam 34 in one or the other of the usual directions, clockwise or counter-clockwise, the shut-off and operating means may be unseated, because of the contact of one of the cam lobes for example with the head 24 about as indicated in FIGURE 4, moving the said head in exaggerated disclosure into the dotted line position, the head of course carrying the rod 14 along with the head, and since the seat portion 12 is engaged with the rod and movable therewith, cause the seat portion to be unseated from the seat at the lower end of the passageway 18.

So long as the cam lobe is maintained in this position, the shut-off and actuating member 10 will of course permit water flow through and into the mixing chamber 27.

The rotation of the cam 34 will cause one of the lobes thereof to engage the head 24 of the shut-off and operating member 10, permitting flow of hot water through the inlet chamber 6 into the mixing chamber 27.

A lesser quantity of cold water will be permitted to flow from the inlet chamber 7 by reason of the opposite cam lobe, being of lesser height or extent, and its coaction with the head 25 on the shut-off and operating member 11.

It will thus be understood how greater or lesser quantities of hot or cold water may be permitted to flow and if the mixture is once attained which is desired, then the stem 33 may be moved outwardly about as indicated by the dotted lines in FIGURE 1 so that the cam 34 occupies the dotted line position in said figure, as caused by the movement of the handle 35 in a reciprocating manner.

It will thus be understood that reciprocation of the cam will increase or decrease the total quantity of fluid flowing through the outlet 28, and rotation of the cam 34 will determine the temperature mixture thereof where hot and cold water are supplied as previously described.

In order to shut the device off, the stem 33 of course is moved back into the full line position, carrying the cam 34 therewith and the handle 35 will likewise occupy the full line position disclosed in FIGURE 1.

A suitable stuffing box packing 36 with stuffing box nut 37 may be availed of to maintain a seal between the stem 33 and said suffing box 37, an escutcheon 38 being supplied if necessary and maintained in position by the escutcheon holder 39, this latter being substantially conventional.

It is noted by way of further description that the outlet line 28 is directed toward an opening 40 in the disc 16 previously described, which will permit the water flow from the mixing chamber 27 as likewise heretofore suggested.

In the modified form of the shut-off mechanism disclosed in FIGURE 8, the mixing chamber 45 is provided in similar manner to the mixing chamber 27 of the first described form by an upper housing member 46 and a lower member 47.

Within the mixing chamber 45, are the actuating members 48 and 49, in this case being substantially identical to the members 10 and 11 as far as the seat portions 50 and 51 at the lower ends thereof, these being discs like those disclosed in FIGURE 5, adapted to seat against the lower surface of the disc 52 for shut-off purposes by line pressure, the disc 52 being of any preferred resilient nature to effect a sealing action in similar manner to the disc 16 first described.

The actuating members 48 and 49 include rods 54 and 55 respectively, in this case the rods being threaded as indicated at 54a and 55a, so as to receive thereon the heads 56 and 57, the threads in the heads which are of plastic material, being arranged so as to have enough interference as between the threads 54a and 55a that once positioned the heads will remain in said positions until adjusted again.

The adjustment of these heads is to facilitate the operation of the valve where it is used in places, for example, where the water pressure is lower than in others, in this instance the head 57 being shown as having been lowered with respect to the rod 55 and yet still remain in a position to be operated by the cam 58 which is a cam like the cam 34 previously described.

The anti-siphon action of the device is identical to that of the first described form, since the lower end of the head 57 will impinge upon the upper surface of the disc 52 when the water pressure drops a predetermined amount.

It is understood that the head 56 is merely shown in its upward adjusted position in contrast to the head 57, this not being a normal condition but disclosed for indication of the adjustability and range thereof.

The volume of water supplied is obviously regulated by movement of the head 57 likewise since this limits the amount that the rod 55 may be tilted within certain areas and also reduces the area through which water may flow from the inlet indicated at 60 and 61.

In the inlet passageways 60 and 61, there are provided certain screen members 62 and 63 which are identical and fastened in place by press fit, the screen members being designed to prevent foreign particles from entering and becoming caught between the seat portions 50-51 and the seats against which these portions operate so that the shut-off of water flow may be effected at all times.

These strainers also reduce any noise which is occasionally found in a device of this nature.

It will be apparent that the operation of the mechanism just before described is identical to that previously set forth with relation to the other figures in the drawing, and as such will not be adverted to at this time.

We claim:
1. In valve construction of the class described, in combination, a body, a pair of horizontally spaced inlet chambers therein, a fluid supply line leading to each, a mixing chamber above said inlet chambers, an outlet therefrom, a passageway leading upwardly from each inlet chamber to the mixing chamber, a seat at the lower end of each passageway, a shut-off and actuating member for each said passageway, said member including a seat portion co-operable with said seat by fluid pressure to prevent the flow therethrough, a seat at the upper end of each said passageway, an actuating part for each member including means extending through each passageway, each shut-off and actuating member including a shut-off section at the upper end adapted to co-act with the seat at the upper end of the passageway to shut-off back flow therethrough when siphon action is initiated, and an operating device having means co-operable with said parts for separate and simultaneous actuation thereof to unseat the same to facilitate fluid flow to the mixing chamber against normal fluid pressure exerted on the fluid supply line leading to said inlet chambers.

2. The combination as claimed in claim 1, wherein the shut-off and actuating members include heads on each of which the shut-off section is provided, said heads being adjustable on the means extending through each passageway for flow regulation through said passageway.

3. The combination as claimed in claim 2 wherein the heads are formed of plastic material and engaged with the means extending through each passageway in a manner to provide self-locking action therewith at infinitely varied positions thereon.

References Cited
UNITED STATES PATENTS

| | | | |
|---|---|---|---|
| 1,822,346 | 9/1931 | Guiles | 137—636.1 X |
| 3,155,115 | 11/1964 | Zeigler | 137—636.4 |
| 3,190,309 | 6/1965 | Staat | 137—636.4 X |

FOREIGN PATENTS 568,628  1/1959  Canada.

CLARENCE R. GORDON, *Primary Examiner.*